Patented Oct. 17, 1933

1,930,542

UNITED STATES PATENT OFFICE 1,930,542

METHOD OF PREPARING FERTILIZER

Silas John Smith, Chatham, Ontario, Canada

No Drawing. Application April 13, 1929
Serial No. 354,985

2 Claims. (Cl. 71—6)

The principal objects of the invention are, to produce a commercial fertilizer with a high analysis of fertilizing media, and to devise a method of producing same with suitable ingredients which will enable the production thereof at extremely low cost.

The principal feature of the invention consists in the novel manner of incorporating the desired fertilizing elements into a fibrous carrier, whereby the said fertilizer elements are transformed into liquid form and thoroughly impregnated in the fibrous carrier in such a manner that they are not observable in their ordinary form and are in a condition to be handled in an economical and effective manner.

In the manufacture of fertilizers it is desirable to utilize a vegetable fibre to contain and form a carrier for fertilizer elements and peat has been used for this purpose.

The present invention proposes a distinct improvement in the method of producing a fertilizer.

According to a preferred manner of carrying the invention into effect a quantity of soluble fertilizer material is applied to a quantity of comminuted moist fibrous material, which may comprise a quantity of peat or bog material comminuted and in its naturally moist state and forming thereof a mechanical mixture, preferably by introducing the soluble fertilizer and fibrous material into a mechanical mixer, the said fertilizer material being preferably in a powdered or comminuted form.

The moisture content of the fibrous element is brought into intimate association with the particles of fertilizer and a partial dissolving of the latter takes place.

The intermixed mass is subjected to a forced drying by the application of heat so that the moisture content of the fibrous material or peat is driven off in the form of steam, the steam acting on the undissolved portion of the fertilizer whereby it is completely dissolved whereupon it is readily absorbed by the fibrous mass to take the place of the dissipated moisture of the latter.

The proportions of the different fertilizer elements and carrier will vary in accordance with the type of fertilizer to be used or produced but it is important that the mixture of materials be neutral in respect to chemical reaction, that is to say, if an alkaline liquor or material is introduced into the mixture a sufficient quantity of a counteracting acid material should also be added.

The preferred constituents to be mixed with the fibrous body of the peat are sulphate of ammonia, nitrate of soda or a soluble synthetic fertilizer carrier or a liquor containing nitrogen, phosphorous and potash or any combination of these elements.

It is found preferable to introduce the mixed materials into a direct heat rotary drier, preferably of from fifty to sixty feet in length, the comminuted materials being introduced at one end of the drier and carried through to the discharge end in a period of approximately thirty minutes.

The steam or vapors escaping from the porous fibrous material dissolves the soluble compounds mixed therewith and the interstices in the fibrous material originally occupied by water are replaced by the dissolved or liquefied inorganic compounds. The materials thus incorporated into the peat are not visible in the dry material in their final form.

In order to carry the present process through successfully the mechanical mixed ingredients fed into the drier should contain from thirty five to sixty percent of moisture and when discharged the moisture contained should be reduced to from four to ten percent.

The dry, finely comminuted mass discharged from the drier contains desirable fertilizing elements thoroughly mixed and incorporated in a fibrous binder in such a manner that they will be given off slowly when placed in the ground as plant food.

The moisture contained in the original bog material is in this process utilized to liquefy the inorganic compounds which are mixed with the fibrous material and as these heavier liquids are absorbed by the drying organic material their moisture is also dissipated so that the final product is a dry finely comminuted material which is very rich in fertilizer ingredients and may be used directly or in combination with other ordinary fertilizing materials.

A fertilizer substance produced in the manner described will retain its finely comminuted form as there is sufficient absorptive quality in the dry organic fibres to prevent the absorption of moisture of the other materials which usually results in the caking or hardening of the mass and which renders the ordinary commercial fertilizers difficult to handle.

A fertilizer such as described is also extremely desirable because the inorganic fertilizing substances are gradually leached out of the carrier as the particles of the fibrous materials break down and gradually decompose in the soil.

It will be understood that in the process the direct application of heat to the mechanically mixed material serves the dual purpose of decomposing or breaking down the inorganic compounds and preparing the organic fibrous material to receive the fluid inorganic matter into its pores or cells.

It will be understood that in the process herein described the danger of burning the fibrous mass is reduced to the minimum as not only is the fibrous material first loaded with moisture but it becomes, immediately after being freed from the moisture, saturated with inorganic compounds which act in the nature of fire extinguishers.

This condition enables the use of direct heat driers instead of the steam tube type of drier which is very commonly used in drying fluffy inflammable substances.

A process such as described effects a direct saving of fuel and the cost of installation of the necessary plant to carry the process into effect is very much less than the other types of driers. The total result is a very much cheaper production.

What I claim as my invention is:—

1. An improved method of making fertilizer comprising applying a quantity of soluble fertilizer material to a quantity of moist fibrous material forming a mechanical mixture, then applying heat to the resultant mixture to dissipate moisture from the fibrous element thereof in the form of steam, and thereby dissolving the soluble fertilizing element and permitting the absorption of the latter by the fibrous material to replace the dissipated moisture content of the latter, continuing the application of heat until substantially all of the original moisture content of the fibrous material is removed.

2. An improved method of making fertilizer from peat or the like, consisting in placing a quantity of the peat in a natural moist condition in a mechanical mixer, adding a quantity of a soluble fertilizing agent in powdered or comminuted form to said moist peat effecting the thorough admixture of the two and the partial dissolving of the fertilizing element by the moisture content of the peat, and finally subjecting the resultant mixture to a forced drying at high temperature to transform the natural moisture content of the peat into a high temperature dissolving agent for the undissolved portion of the fertilizing element to complete the dissolving of the latter and permit its absorption by the peat to replace the removed moisture content thereof.

SILAS JOHN SMITH.